Figure 1:
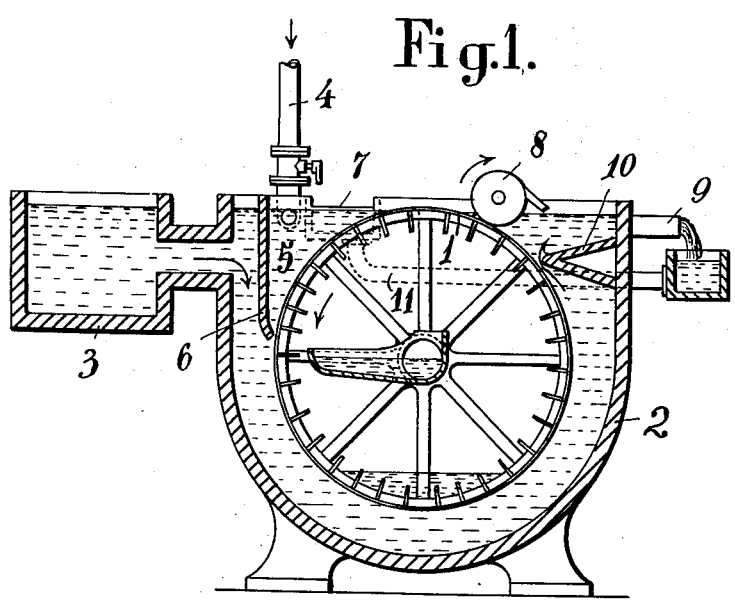

No. 898,212. PATENTED SEPT. 8, 1908.
H. GAARA & E. HEM.
METHOD OF AND APPARATUS FOR STRAINING THE WASTE WATER IN PAPER MILLS, WOOD PULP FACTORIES, AND THE LIKE.
APPLICATION FILED APR. 20, 1908.

Witnesses:

Inventors
Halvor Gaara
Eilif Hem

UNITED STATES PATENT OFFICE.

HALVOR GAARA AND EILIF HEM, OF TELEMARKEN, NORWAY.

METHOD OF AND APPARATUS FOR STRAINING THE WASTE WATER IN PAPER-MILLS, WOOD-PULP FACTORIES, AND THE LIKE.

No. 898,212.   Specification of Letters Patent.   Patented Sept. 8, 1908.

Application filed April 20, 1908. Serial No. 428,249.

*To all whom it may concern:*

Be it known that we, HALVOR GAARA and EILIF HEM, subjects of the King of Norway, both residing at Telemarken, Norway, have invented certain new and useful Improvements in the Methods of and Apparatus for Straining the Waste Water in Paper-Mills, Wood-Pulp Factories, and the Like; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention consists in a method of and apparatus for straining the waste water in papermills, wood pulp factories and the like. When recovering the finely divided short fibers contained in the waste water in paper mills, wood pulp factories and the like, by means of the well known cylindric strainers a considerable quantity of the fibers passes through the pores or openings of the strainer cloth and is lost. By using a very fine strainer cloth, the loss of material would be less, but on the other hand the drawback then arises that too fine cloths are very quickly worn out and the fine pores of the same are choked up already after short use. It has been proposed in order to remedy these defects, periodically to supply asbestos fibers to the filtering apparatus, in order that such asbestos fibers may make the strainer of the drum tighter. A periodical supply of long fibered stuff is not, however, applicable in the apparatus employed for clearing the waste water in paper mills, wood pulp mills and the like, owing to the considerable quantities of water to be cleared. If a considerable quantity of water is to be cleared by these apparatus, it is necessary that the mass deposited on the cylinder should be continually removed from the same; but if this is done, the long fibers will then be simultaneously removed; for an efficient means of removing the short fibers without simultaneously removing the subjacent filter layer, which consists of long fibers, is not yet known. The said drawbacks are avoided by the present method according to which a strainer is employed for recovering the short-fibered material, long-fibered material being continually fed to said strainer in such a way as to enable it to deposit itself on the continually rotating cylinder, before the short-fibered material is filtered through the filter layer thus formed.

The arrangement according to the present invention consists in providing along the whole length of the cylinder, where the strainer passes down into the water, a separate space, into which relatively long-fibered material is continually fed, for the purpose of causing this mass to deposit itself on the cloth in the said compartment and to form, on the outer side of the cloth, a filter layer, which prevents the relatively short-fibered mass, contained in the liquid to be cleared, from passing through the strainer during the further movement of the same through the container.

Figure 2:
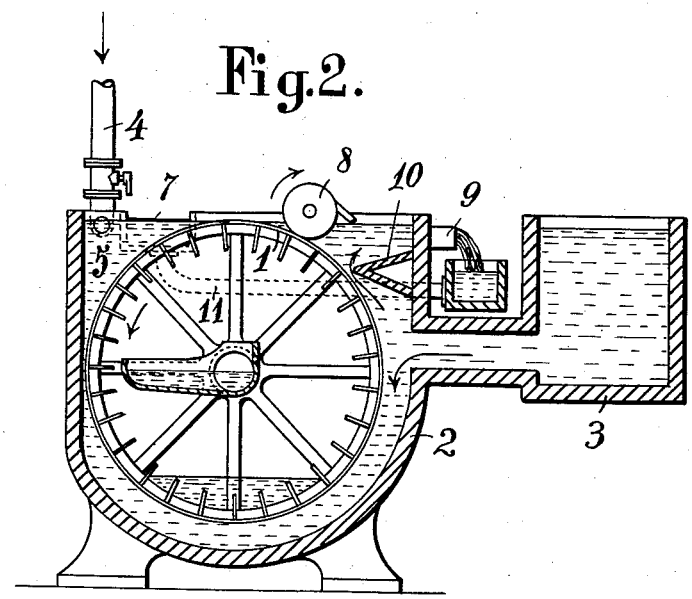

In the accompanying drawing two forms of strainer embodying the invention are shown in section (Figures 1 and 2).

1 is the straining cylinder of the apparatus moving in the direction of the arrow; 2 is the container, in which the cylinder rotates; 3 is the inlet channel for the exhaust water to be cleared.

The relatively long-fibered mass is passed from a conduit 4 to a separate compartment 5, which is located where the clean strainer cloth passes into the liquid. In this compartment the long-fibered material, during the rotation of the drum, is continually deposited unimpeded by the short-fibered material outside the said compartment. In spite of being, without interruption, continuously filtered, the latter material, therefore, only gets into contact with long-fibrous material already completely deposited, whereby loss of short-fibrous material is avoided, and the use of comparatively coarse-meshed strainer cloth rendered possible. The inlet channel 3 can of course, as shown in Fig. 2, also be located at the opposite side, in which case the wall 2, as shown in the drawing may be disposed so near the cylinder at the opposite side as to replace the screen 6 provided in Fig. 1 to form a wall of compartment 5. A certain amount of fibers of the long-fibered mass fed to the compartment 5 will always pass through the cloth, before the filter layer has been ready formed. In order that such fibers may not be lost, the apparatus, according to the present invention, is provided with a cylinder of the known type, that conducts the water passing through the cylinder cloth and containing the material in question, away from the clean water subsequently discharged.

In apparatus designed for straining the exhaust water from wood pulp mills, the long-fibered material may be obtained from the inlet channel to the paste board machines or the decker machines. In a paper mill combined with a wood pulp mill or a cellulose factory the long-fibrous mass to be supplied to the clearing apparatus for the water discharged from the paper machines is obtained from the pulp mill or the cellulose factory.

If the strainer for any length of time operates without being inspected, and the apparatus in consequence hereof for some reason or other should stop, the material would be lost, owing to the long-fibered material's flowing over the container. To avoid a loss of material occasioned hereby an overflow channel 7 is provided above the normal water level, through which channel the long-fibered material, when required, may flow out of the container 2 and, by way of a conduit 11 or the like, be discharged into the pulp containing water 9 flowing from the strainer or clearing apparatus. The mass deposited on the strainer cloth is carried off in a well-known manner by means of a roller and a scraping device 8 or by other known means. The mass flowing from the roller 8 may in some cases, as shown in the drawing, be discharged from the container at 9 together with the water, and in a manner previously known be returned to the paste board machines or the decker machines to be utilized in the same. 10 is a screen that may be variously disposed. It is designed to prevent the mass flowing from the roller from sinking to the bottom.

Claims.

1. The method of straining the waste water in paper factories, pulp factories and the like, which consists in directing to the straining surface of a straining apparatus independently of and simultaneously with the water to be strained a quantity of long-fibered pulp so as to continually form a layer of long-fibered material on the straining surface before the latter comes into contact with the water to be strained, and removing it continuously together with the short fibers deposited thereupon.

2. A strainer comprising a strainer body and a container, means for conducting the water to be strained to the container, means for conducting long-fibered straining material to the container simultaneously with but independent of the water to be strained and in direct contact with the straining surface, and means to continually remove the fibers deposited on the straining surface.

3. In a strainer a container, having a main compartment and an auxiliary compartment and a separate supply to the two compartments.

4. In a strainer a container and a rotatory cylindrical strainer body placed therein, so that on one side the strainer cylinder passes close on to the wall of the container.

In testimony that we claim the foregoing as our invention, we have signed our names in presence of two subscribing witnesses.

HALVOR GAARA.
EILIF HEM.

Witnesses:
HENRY BORDEWICH,
MICHAEL ALGER.